(12) United States Patent
Leban

(10) Patent No.: US 6,523,819 B1
(45) Date of Patent: Feb. 25, 2003

(54) SUPPORT DEVICE WITH FLOATING PINS BAG

(75) Inventor: David F. Leban, Geneva, IL (US)

(73) Assignee: DFL Tool Inc., Batavia, IL (US)

( * ) Notice: Subject to any disclaimer, the term of this patent is extended or adjusted under 35 U.S.C. 154(b) by 26 days.

(21) Appl. No.: 09/957,198

(22) Filed: Sep. 20, 2001

Related U.S. Application Data

(62) Division of application No. 09/548,338, filed on Apr. 12, 2000, now Pat. No. 6,293,534.

(51) Int. Cl.[7] ................................................ B23Q 3/00
(52) U.S. Cl. ...................... 269/309; 269/266; 269/903; 269/20; 29/559
(58) Field of Search ................................ 269/309, 266, 269/903, 20, 47, 296, 53, 54, 54.1; 29/559

(56) References Cited

U.S. PATENT DOCUMENTS

| | | | | |
|---|---|---|---|---|
| 3,938,798 A | * | 2/1976 | Solie et al. ..................... | 269/20 |
| 5,191,821 A | * | 3/1993 | Metzger ....................... | 83/425 |
| 5,282,392 A | * | 2/1994 | Fan ............................ | 74/424.8 |
| 5,984,293 A | * | 11/1999 | Abrahamson ................ | 269/266 |
| 5,992,649 A | * | 11/1999 | Wark ........................... | 269/47 |
| 6,264,187 B1 | * | 7/2001 | Hertz .......................... | 269/266 |
| 6,293,534 B1 | * | 9/2001 | Leban ......................... | 269/309 |

* cited by examiner

Primary Examiner—Joseph J. Hail, III
Assistant Examiner—Daniel Shanley

(74) Attorney, Agent, or Firm—John L. Schmitt

(57) ABSTRACT

A device particularly adapted to engage an irregular bottom surface of an object and then carry that object includes a support block. In the support block is a set of longitudinally spaced apart upright bores. On each side of the bores in a top wall of the block is a guide channel for a slide bar. Ends of these bars operatively connect with a reciprocating mechanism attached to one end of the block. In each bore is a sleeve having an inner opening formed with an upper section for a spring. An upper and lower end coil of a coil portion of each spring connects with an arm that projects outwardly. The upper arms fit respectively in upward facing slots in one slide bar while the lower arms fit respectively in downward facing slots in the other slide bar. In the sleeve inner openings and extending respectively through the coil portion of each springs is a support pin. Top ends of these pins fit in openings in a top cover plate fastened to the support block top wall. A bottom end of each pin then seats on one end of a transversely positioned conduit in a top surface of a bottom cover plate fastened to a bottom wall of the support block. Opposite ends of these conduits connect with a distribution channel in the block bottom wall. For use, the device distribution channel is connected to an air supply. At the same time, the reciprocating mechanism is activated to move the slide bars and rotate the end coils of the springs. Movement of the end coils transfers to the remaining coils of each spring to increase a diameter of each spring coil portion and shift each spring from a locking mode to a release mode. Air from the distribution channel then floats the pins upward to selectively engage the bottom surface of the object above. The reciprocating device then is deactivated allowing the springs to return to a locking mode about the pins.

6 Claims, 4 Drawing Sheets

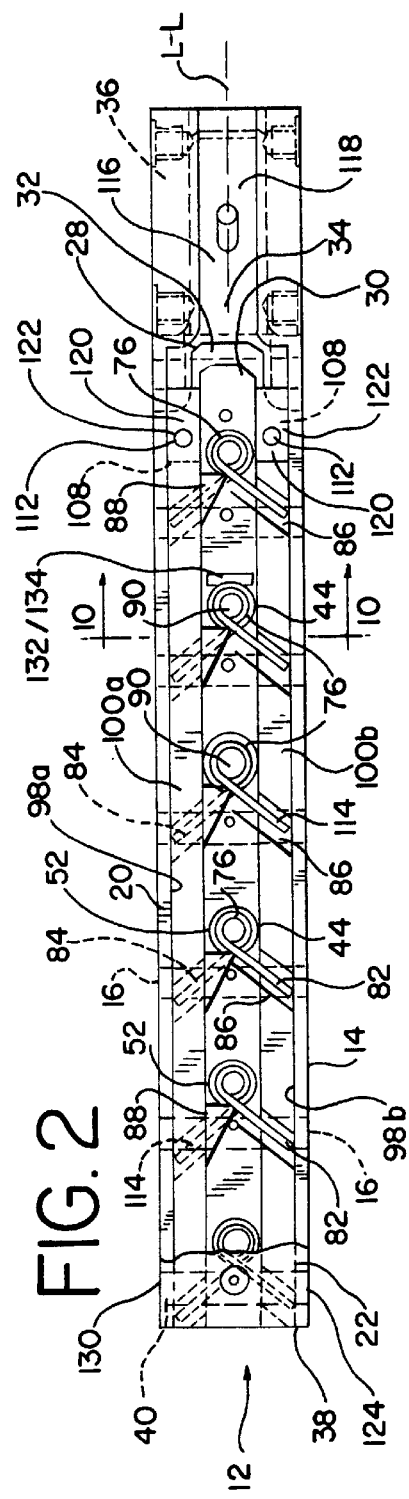
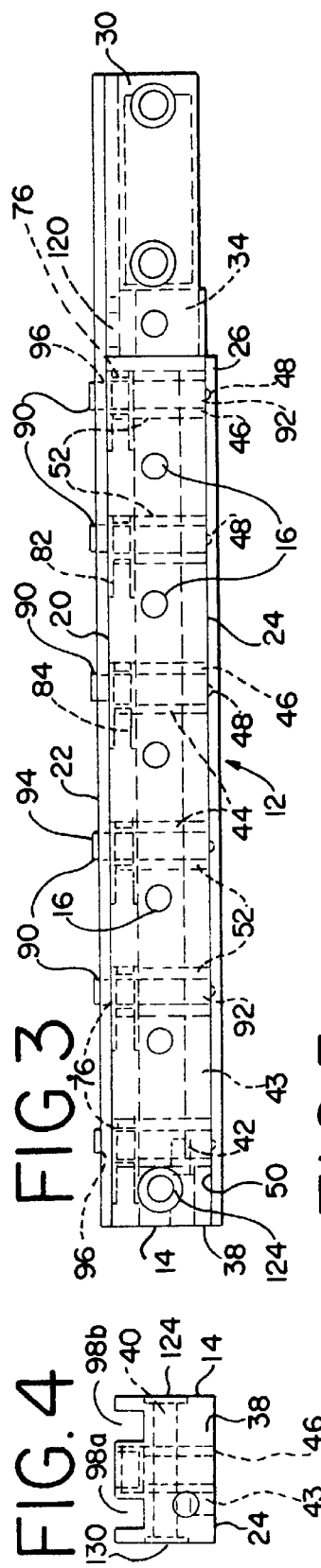
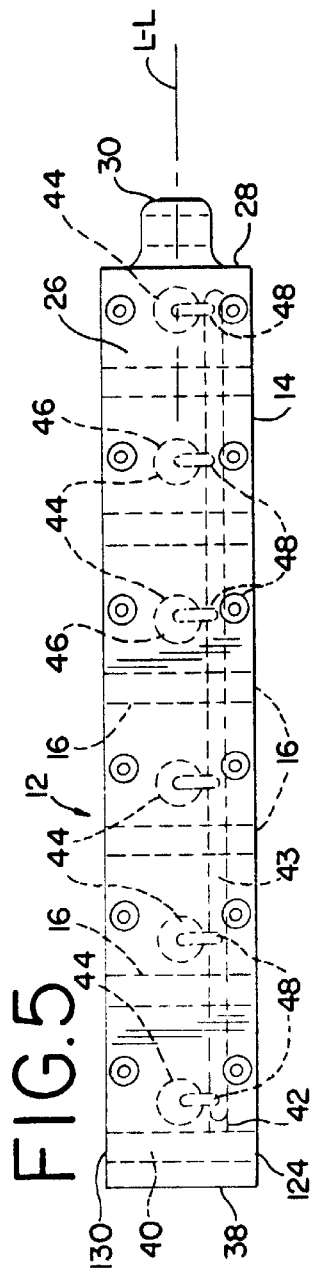
FIG. 2
FIG. 3
FIG. 4
FIG. 5

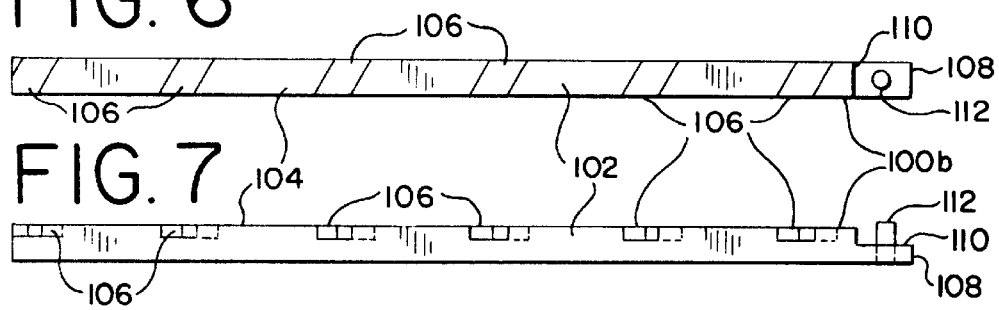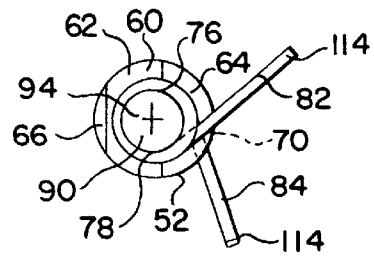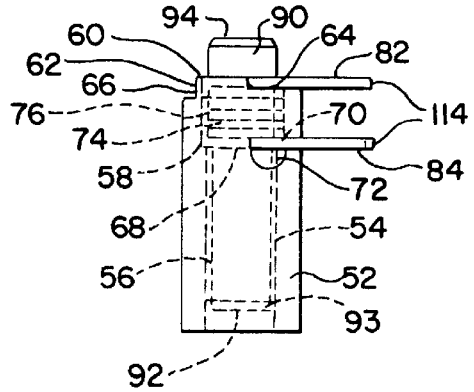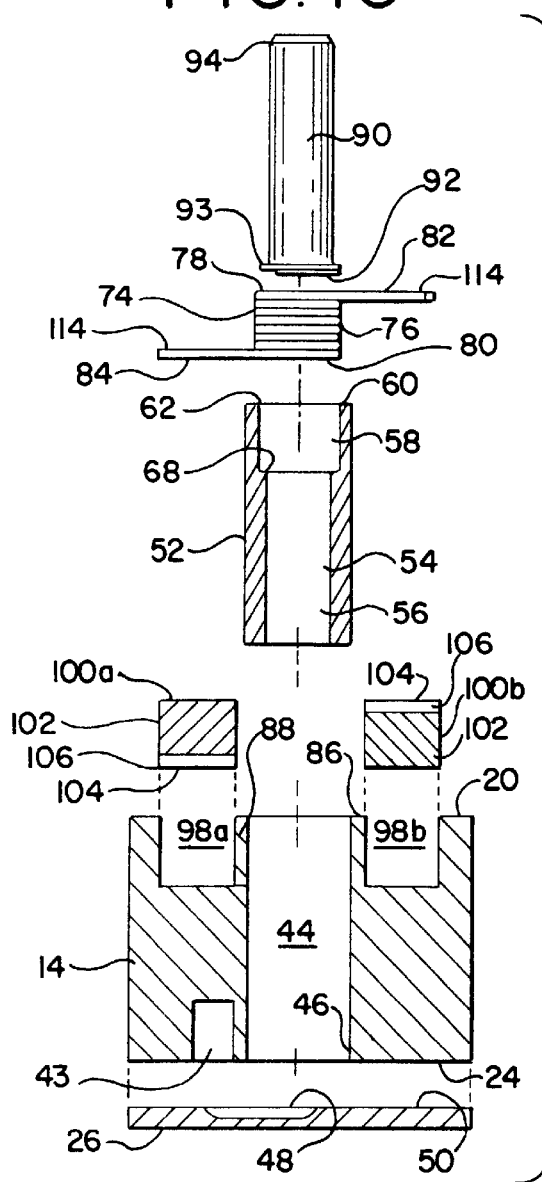

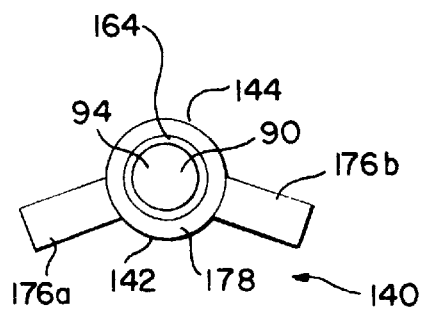
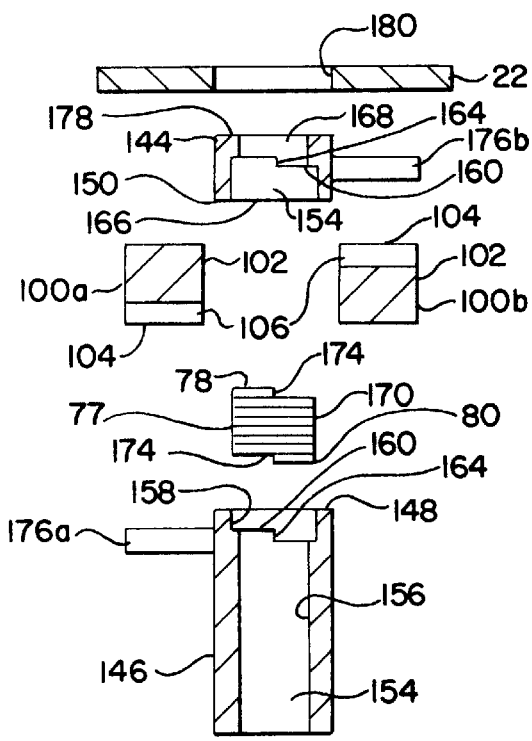
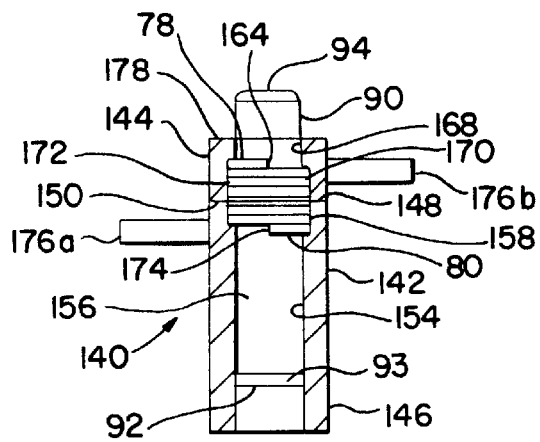
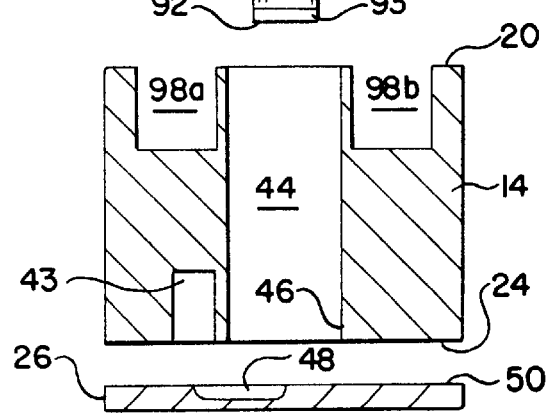

SUPPORT DEVICE WITH FLOATING PINS BAG

This application is a division of application Ser. No. 09/548,338 filed Apr. 12, 2000; now U.S. Pat. No. 6,293,534 issued on Sep. 25, 2001.

BACKGROUND OF THE INVENTION

1. Field of the Invention

This invention relates generally to support devices and more particularly to a support device having a set of pins that may be floated upward to engage an irregular bottom side of an object and then support that object.

2. Prior Art

Devices to engage and then support objects having varying configurations are well known and been in use for many years. Four such devices are described below.

A first support device is disclosed in U.S. Pat. No. 2,985,901. This device is adapted for bonding soles to footwear. The device includes an I-shaped base having a series of aligned, vertically positioned cylinders. In each cylinder is a piston of a T-shaped bar that is pushed upward by a spring in a bottom of the cylinder. Upward movement of the cylinders is restrained by springs on bolts that are secured to respective ends of the bars and extend upward through openings in ends of a top flange of the base. For use, a bottom sole of a shoe is placed on the T-bars. The bars then are forced upward by oil pressure in the cylinders until the shoe sole engages an upper portion of the shoe. Because the sole has an irregular bottom surface, the distance that individual T-bars move depends on the distance between that T-bar and the point of contact with the shoe sole.

A variable contour securing system, as shown in U.S. Pat. No. 4,088,312, is the second support device. This device includes a housing formed by joining a set of blocks. Each block has a bottom space that connect to form a vacuum chamber. A lower end of a vertical bore in each block then connects with the chamber. In each bore is a movable cylinder having a bottom end that seats on a spring in the chamber. On a top end of each cylinder is a suction cup that extends above the housing. Respective passageways in the cylinders link the cups to the vacuum chamber. For use, a vacuum source is activated so that the cups may fasten to a bottom side of an object. Where the object has an irregular shaped bottom side, the respective vertical positions of the cups vary. Once the cups are engaged, the location of the cylinders is secured by air activated locking plugs located in cavities in the housing.

The third device, set out in U.S. Pat. No. 5,152,707, is particularly adapted to support a face panel of a cathode ray tube and includes a box-shaped base. This base is divided into an upper and lower chamber by an intermediate partition. In a top wall of the base and the partition is a set of pairs of vertically aligned openings. Positioned in each opening pair is a sleeve formed with four radially spaced apart, vertical slits. These slits then are covered by a flexible tube fitting about the sleeve. In each sleeve is a pin having a bottom end located in the lower chamber and a top end that extends above the base top wall. For use, the lower chamber is pressurized forcing the pins upward to engage the face panel of a cathode ray tube. Once contact has been made, the base upper chamber is pressurized to force the flexible tubes into the sleeve slots and into contact with the pins. This contact produces a frictional interface that inhibits further pin movement.

The last example is holding apparatus set out in U.S. Pat. No. 5,984,293. This apparatus is particularly adapted to support printed circuit boards and comprises a base formed with a plurality of vertical chambers. In these chambers are respective springs, for example, to upwardly bias bottom foot portions of support pins carried in the chambers. Upper ends of the pins extend through respective aligned openings in a lock plate and a top plate. For use, a board is placed in contact with the pin upper ends so that the pin ends engage a bottom side of the board and electronic components on the board bottom side. The pins are selectively depressed depending on the particular point of engagement. Once the pins are in place, the locking plate is shifted horizontally so that sidewalls of the locking plate openings interact with the pins to secure pin location.

SUMMARY OF THE INVENTION

A support device on this invention is particularly adapted to engage an irregularly configured bottom surface of an object and then carry that object. The device includes a support block having a set of upright bores. In each bore is a sleeve for a spring carried in an upper section of an inner opening in the sleeve. A support pin having a bottom end slidably disposed in a lower section of the sleeve inner opening then extends upward through a coil portion of the spring where the pin is held tightly by coils of the spring. Next to the bores in a top wall of the support block is a first guide channel for a movable slide bar. One end of the movable slide bar operatively connects with a reciprocating mechanism attached to one end of the support block.

An uppermost end coil of each spring connects with an upper arm, and the lowermost end coil of the spring connects with a lower arm. The upper arms, for example, are operatively connected to the movable slide bar. The lower arms then are connected to the block or operatively joined to a second slide bar. Where the respective arms joined to the spring end coils vertically align, the second slide bar is located below the first slide bar in the first guide channel. Where the upper and lower arms are arcuately offset, the second arms may be connected to the block or operatively connected to the second slide bar now carried in a second guide channel located in the block top wall on an opposite side of the bores. The slide bars, springs, and sleeves are held in place by a top cover plate attached to the top wall of the support block. This cover plate includes a set of openings for top ends of pins.

The bottom ends of the pins fit one each over one end of a set of transversely positioned conduits formed in a top surface of a bottom cover plate fastened to a bottom wall of the support block. Opposite ends of these conduits intersect with an air distribution channel in the support block bottom wall. An open end of this channel then connects with a transversely positioned air supply duct in an opposite end of the support block.

For use, the device supply duct is connected to an air supply. Air flowing from the duct to the distribution channel is regulated by a valve carried by the support block and located to extend into the distribution channel open end. To allow the pins to float upwardly, the reciprocating mechanism is activated to move the arms and thereby rotate the coils of the springs. Where, for example, the coils of the springs are wound clockwise from the uppermost end coil to the lowermost end coil, a clockwise rotational movement of the uppermost end coils transfers to the remainder of the coils to effect a diameter increase of each spring coil portion. Counterclockwise movement of the spring lowermost end coils produces a like effect. Were the springs wound counterclockwise, the direction of the spring upper and lowermost end coil rotation is reversed to produce a like effect. The arms connected to the spring end coils facilitate the transfer of force needed to effect coil rotation and the resulting coil enlargement. As the spring coils are enlarged, the springs shift from a locking mode to a release mode. Once the springs are in a release mode, the pins float upward from air flowing through the conduits and under the pin bottom ends. Respective upward movement of the pins terminates when the top end of a pin contacts a particular point on the bottom surface of the object thereabove. The reciprocating mechanism then is deactivated so that the arms return to the arcuate spacing that places the spring coil portions in their locking mode so that the pins support the object.

The support device with floating pins of the invention provides several advantages over like devices known or in use.

A first advantage is that pin support can be readily tailored to support objects having varying bottom surface configurations. Where, for example, this inventive device is used to support a printed circuit board during connection of various electronic components attached on a bottom surface of the board, the pins engage the board surface, electronic components attached to the board, and component connections. Because the flow of air that floats the pins upward is slight, there is no damage to or dislocation of an electronic component if a pin engages a component. Additionally, there is no component dislocation when the pins are locked in place.

A second advantage is that the pattern of pin support can be readily customized to support a second object having a different bottom surface configuration. By disconnecting the air supply to the pins and unlocking the pins, the pins retract under the force of gravity. Support of the second object may be effected simply by reconnecting the air supply to float the pins upward until the pins engage the second object bottom surface. The pins then are locked in place by allowing the springs to return to their locking mode. Note that because the pins may be readily withdrawn and then reset, objects may be slide over and away this support device. There is no need for an object to be lifted on to or off the device.

A further advantage is that top ends of the pins may be shaped to engage the object bottom surface in a precise complementary manner. Where the irregularity of the object bottom surface is pronounced, it may be advantageous for a top end of a pin to be pointed to engage only a small area of this surface. Additionally, once the pins of this device are locked in place, these pins may carry heavy loads. Thus, with adequate support from below, substantial workloads may be applied to a top surface of the object.

A next advantage is that a series of devices may be joined to form an apparatus having varying matrices of supporting pins. Apparatus formation is facilitated by extending aligning rods transversely through openings in the support blocks of the devices and then connecting an outlet port of one device supply duct to an inlet port of the supply duct of an adjacent device. Note that where the apparatus comprises more than one support device of this invention, only one reciprocating device is needed to lock and unlock the springs.

Lastly, the support device of this invention has an extended useful life. Models of the device have been cycled more a one million times without a failure. Since the device has application in continuous, high production manufacturing, device failure must be infrequent.

DESCRIPTION OF THE DRAWINGS

FIG. 2 is a plan view of one device of FIG. 1 with most of a top cover plate of the device removed.

FIG. 3 is a side elevational view of the device shown in FIG. 1.

FIG. 4 is an end elevational view of a support block of the device of FIG. 1.

FIG. 5 is a bottom view of the device of FIG. 1 shown without an actuating mechanism.

FIG. 6 is a plan view of a slide bar of the device of FIG. 1.

FIG. 7 is a side elevational view of the slide bar of FIG. 6.

FIG. 8 is a plan view of an assembly comprising a pin sleeve, a retaining spring, and a floating pin of the device of FIG. 1.

FIG. 9 is a side elevational view of the assembly of FIG. 8.

FIG. 10 is an explosion view showing the relationship between the support block, the slide bars, the pin sleeve, the retaining spring, the floating pin, and bottom cover plate of the device.

FIG. 11 is a plan view of an embodiment of a further assembly comprising a pin sleeve, a retaining spring, and floating pin for the device of FIG. 1.

FIG. 12 is a side elevation view, partial in section, of the assembly of FIG. 11.

FIG. 13 is an explosion view showing the relationship between the support block, the slide bars, the floating pin, the bottom cover plate, the top cover plate, and the modified assembly shown in FIGS. 11 and 12.

DESCRIPTION OF THE PREFERRED EMBODIMENT

Figure 1:
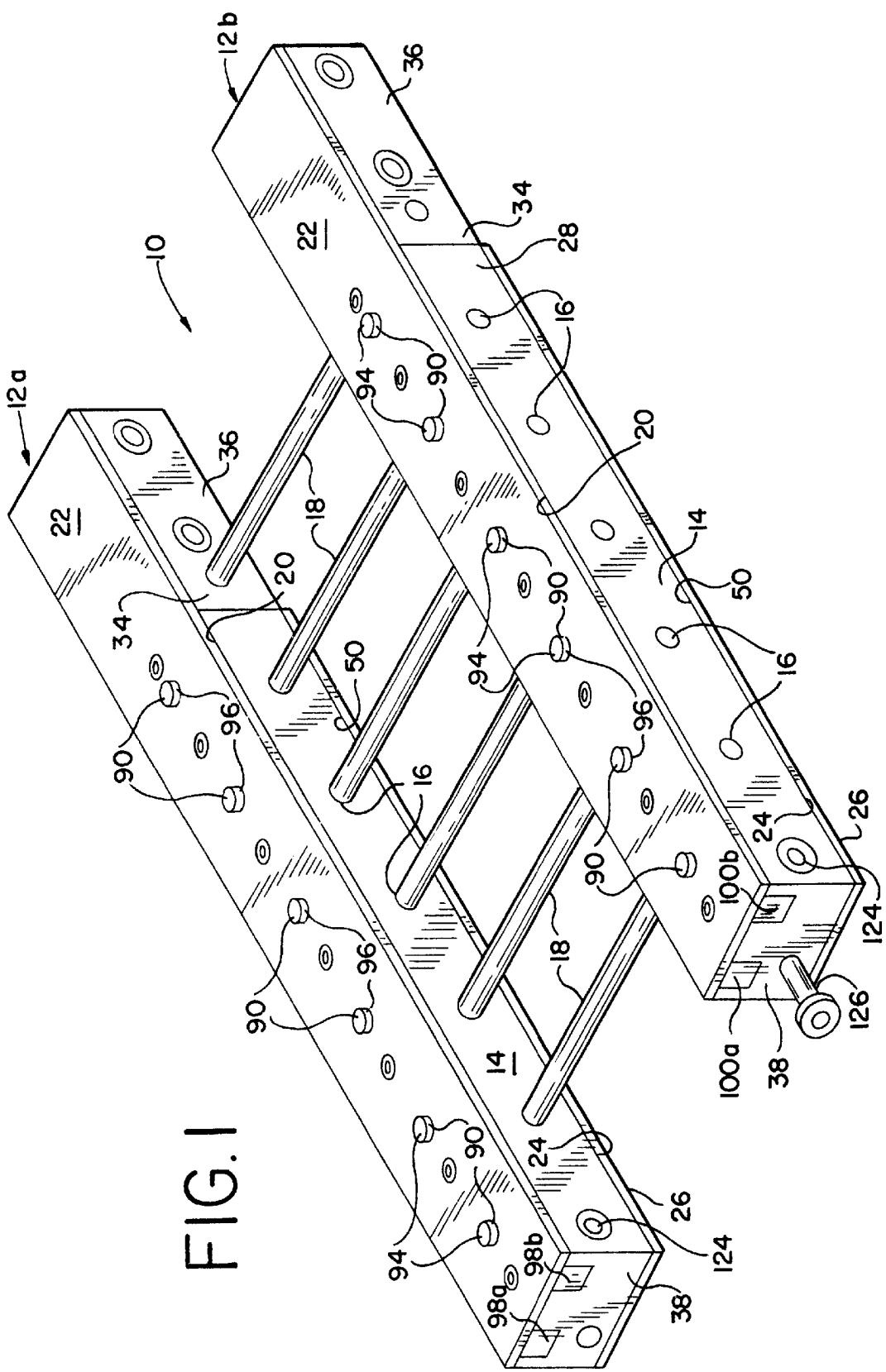
FIG. 1 is a perspective view of two devices of this invention connected for subsequent forming an apparatus having a matrix of floating support pins.

Apparatus 10 comprising a pair of support devices with floating pins of this invention is shown generally in FIG. 1. As shown, the support devices are designated 12a, 12b. Since the devices 12a, 12b are identical, the structure of only one device is described, and the device then simply is designated 12. Each device 12a, 12b of the apparatus 10 includes a support block 14 formed with a set of spaced apart, transversely positioned, horizontal openings 16. As seen in FIG. 1, rods 18 have been inserted through the openings 16 in the support blocks 14 of the devices 12a, 12b. Joining a series of support devices 12 to create an apparatus, like apparatus 10, having a matrix of floating pins is discussed below in greater detail.

As seen in FIGS. 1–3, attached to a top wall 20 of the support block 14 is a top cover plate 22 and attached to a bottom wall 24 of the block 14 is a bottom cover plate 26. Then, as shown in FIGS. 2 and 5, on a first end 28 of the block 14 is a guide post 30 that fits into a recess 32 formed in an inner end 34 of an operative mechanism 36. This mechanism 36 preferably is an air operated cylinder that produces a reciprocating action.

Extending transversely through a second end 38 of the block 14 is an air supply duct 40. The supply duct 40 intersects with an open end 42 of a distribution channel 43 extending longitudinally along one side of the bottom wall 24 of the block 14. Aligned with a longitudinal axis L-L of the block 14 is a set of spaced apart, upright, cylindrical bores 44. As shown, the block 14 has six bores 44. Bottom ends 46 of the bores 44 are connected respectively to the distribution channel 43 by a set of semicircular shaped conduits 48 formed in a top surface 50 of the bottom cover plate 26, see FIGS. 3, 5 and 10.

As best understood by viewing FIGS. 8–10, disposed in each support block bore 44 is a cylindrical shaped sleeve 52 having an inner opening 54. Each sleeve inner opening 54 is divided into a lower, small diameter section 56 and an upper, large diameter section 58. A top end 60 of the sleeve 52 includes a peripheral ledge 62 formed with a cutout 64. The cutout 64 is defined by aligned end walls spaced about 170 degrees apart. Opposite the sleeve top end cutout 64 in the peripheral ledge 62 is a key way slot 66. Vertically aligned with the cutout 64 and horizontally aligned with a circular offset 68 formed at a joinder of the sleeve inner opening lower and upper sections 56, 58 is horizontally slit 70. One end of the slit 70 includes an opening 72 having a size at least twice the vertical height of the slit 70, see FIGS. 8 and 9.

Disposed in each sleeve inner opening upper section 58 is a coil portion 74 of a spring 76. Coils 77 of the spring coil portion 74 are wound clockwise from an uppermost end coil 78 to a lowermost end coil 80. The end coils 78, 80 of each spring 76 connect respectively with a tangentially extending upper arm 82 and lower arm 84. These arms 82, 84 are positioned about 110 degrees apart. The upper arms 82 extend respectively through the sleeve top end cutouts 64 and spaced apart recesses 86 formed in the block top wall 20 on one side of the bores 44. The lower arms 84 extend respectively through sleeve slits 70 and then through spaced apart, vertical openings 88 formed in block top wall 20 on an opposite side of the bores 44. Note that except for the sleeve top end cutouts 64, the uppermost end coils 78 of the springs 76 are encased by the sleeve top end peripheral ledges 62. The purpose of the opening 72 in each sleeve 52 is to facilitate initial location of the lower arm 84 in the sleeve slit 70.

Slidably carried in each sleeve inner opening lower section 56 and extending through each spring coil portion 74 is a pin 90. A bottom end 92 of each pin 90 is formed with peripheral flange 93. A length of each pin 90 is such that bottom ends 92 of the pins 90 rest on the top surface 50 of the bottom cover plate 26. Top ends 94 of the pins 90 then extend through openings 96 in the block top cover plate 22.

As seen in FIGS. 2 and 10, in the top wall 20 of the block 14 and positioned on respective sides of the bores 44 are guide channels 98a, 98b for slide bars 100a, 100b. Structure of the slide bar 100b is shown in detail in FIGS. 6 and 7. Each slide bar 100a, 100b has an elongated body 102. In a wall 104 of the bar body 102 is a set of six angularly positioned slots 106. As shown in FIGS. 6, 7 and 10, the slots 106 in the slide bar 100b face up; then as shown in FIGS. 2 and 10, the slots 106 in the slide bar 100a face down. Regardless, these slots 106 are spaced apart at a distance substantially equal to the spacing of the support block bores 44. One end 108 of each slide bar body 102 is formed with an offset 110 for an upstanding pin 112.

The slide bar 100b is carried in the guide channel 98a so that its slots 106 face up. As located, outer ends of the upper arms 82 fit respectively in the slots 106 of slide bar 100b. The slide bar 100a then is carried in the guide channel 98a so that its slots 106 face down. Outer ends 114 of the lower arms 84 fit respectively in the slots 106 of the slide bar 100a. As seen in FIG. 2, operatively joined to the inner end 34 of the reciprocating mechanism 36 is a body portion 116 of a yoke 118. Arms 120 of this yoke 118 fit respectively in the offsets 110 of the slide bars 110a, 100b so that the slide bar pins 112 may fit in end openings 122 in the yoke arms 120.

Operation of the device 12 requires connecting the device reciprocating mechanism 36 and an inlet 124 of the block supply duct 40 to an air supply in a known manner. While the air supply to the mechanism 36 would include external valving, pressure of air from the block supply duct 40 is regulated by a control valve 126 carried in the block second first 38, see FIG. 1 wherein the device 12b is shown fitted with a valve 126. The value 126 has a valve stem (not shown) that selectively locates in the open end 42 of the distribution channel 43 to regulate air flow to the sleeves inner openings 54.

Where only one device 12 is to be used, an outlet port 130 of the supply duct 40 is plugged. Where more than one device 12 are combined, for example two device's 12a, 12b to form apparatus 10 as shown in FIG. 1, the outlet port 130 of the device 12b is connected to the inlet port 124 of the device 12a. This joinder is facilitated by the rods 18 inserted through the support block openings 16 in the devices 12a, 12b that maintain the adjacent air duct outlets 130 and air duct inlets 124 alignment.

As discussed above, the device 12 is particularly adapted for connecting a set of like devices 12 to form apparatus providing a matrix of pins 90. FIG. 1 shows a pin matrix comprising two six-pin columns and six two-pin rows. Note that the devices 12a, 12b may be closely packed in a side-by-side relationship or spaced apart.

Where the apparatus is used to support printed circuit boards, for example, six devices 12 typically are closely packed to provide a 36-pin matrix of six columns and six rows. With a circuit board positioned above the apparatus comprising six devices 12, air is introduced to the now connected supply ducts 40 of six devices 12 to charge the respective distribution channels 43. At the same time, the mechanism 36 of each device 12 is activated to move the slide bars 100a, 100b of each device 12 away from the mechanism 36 (toward the block second end 38). End walls of the slide bar slots 106 interact with the outer ends 114 of the upper and lower arms 82, 84 to rotate the spring uppermost end coils 78 clockwise and the spring lowermost end coils 80 counterclockwise. This movement transfers from the spring uppermost end coils 78 and lowermost coils 80 to the remaining coils 77 of each spring coil portion 74. As the spring coils 77–80 now are rotated, a diameter of the coils 77–80 of each spring 76 increases so that the springs 76 change from a locking mode to a release mode. Uniformity of this diameter enlargement is enhanced in part by containment of the uppermost end coil 78 of each spring 76 by the sleeve top end peripheral ledge 62. Once the springs 76 are their release mode, the pins 90 are free to float. Charged air from the distribution channel 43 then flows through the bottom cover plate conduits 48 forcing the pins 90 upward. Each supply duct control valve 126 is set to produce a minimum impacting force when the top ends 94 of the pins 90 contact a bottom side of the board, components extending downward from the board bottom side, or connections between components. When pin contact is complete, the device reciprocating mechanisms 36 are deactivated so that the springs 76 return to their pin locking mode.

When locked in place, one pin 90 may support up to about 10 pounds. Note that the pins 90 may be returned to their retracted position by shutting off the air supply to the supply ducts 40 and activating the mechanisms 36 to place each spring 76 in its release mode.

To prevent sleeve rotation during operation of the device 12, in each block top wall 20 is a set of key way recesses 132. These recesses 132 respectively intersect the bores 44 and align with the sleeve key way slots 66. Compressively inserted keys 134 in these sleeve key way slots 66 and block recesses 132 inhibit any sleeve rotational movement. FIG. 2 shows the structure of one typical key-slot-recces combination.

It should be understood that when the operative mechanism 36 is in a deactivated state, the slide bar slots 106 may be positioned maintain the springs 76 in an expanded release mode. The mechanism 36 then is activated to allow the spring coils 77–80 to rotate so that the springs 76 shift to a contracted locking mode. The useful life of the springs 76 appears improved by using the first described procedure.

Using the procedure described above, the pins 90 of the devices 12 joined to form an apparatus that can be readily reset. As reset, the pins 90 may engage the bottom side of most any circuit board or other object in a damage-free and dislocation-free manner regardless of irregularity of the bottom side configuration of the object to be supported. Then, depending on the size and weight of that object, the number of devices 12 joined is selected so that pin support of the object is evenly distributed.

A modified sleeve-spring-pin assembly is shown generally in FIGS. 11–13 and designated 140. Like reference numbers are used to identify like structure, and previously used reference numbers are used to identify previously identified structure.

A sleeve 142 of the assembly 140 includes an upper portion 144 and a lower portion 146 with a top end 148 of the sleeve lower portion 146 abutting a bottom end 150 of the sleeve upper portion 144. The sleeve lower portion 146 has an inner opening 154 defined by a lower small diameter section 156 and an upper large diameter section 158. As seen in FIG. 13, a peripheral ledge 160 at a joinder of the sections 156, 158 is cutout to form a vertical end wall 164 in the sleeve lower portion ledge 160.

The sleeve upper portion 144 also has a like inner opening 154 defined by a lower large diameter section 166 and an upper small diameter section 168. A peripheral ledge 160 at a joinder of the sections 166, 168 also is cutout to form a vertical end wall 164 in the sleeve upper portion ledge 160.

As seen in FIGS. 12 and 13, a spring 170 is disposed in an inner space 172 defined when the large diameter section 158 of the sleeve lower portion 146 is joined to the large diameter section 166 of the sleeve upper portion 144. As located, an end 174 of a lowermost end coil 80 of the spring 170 abuts the end wall 164 of the sleeve lower portion 146, and an end 174 of an uppermost end coil 78 of the spring 170 abuts the end wall 164 of the sleeve upper portion 144.

For use, first outward extending arms 176a respectively attached to the sleeve lower portions 146 fit in respective downward facing slots 106 of the slide bar 100a of the device 12. Second arms 174b attached respectively the sleeve upper portions 144 then fit in respective upward facing slots 106 of the slide bar 100b. Additionally, top ends 176 of the sleeve upper positions 144 fit respectively in openings 178 in the top cover plate 22.

Movement of the slide bars 100a, 100b, as discussed earlier, transfers respectively to the sleeve lower and upper portions 144, 146 to rotate the lowermost and uppermost end coils 80, 78 of the springs 170. Rotation of the end coils 78, 80 of the springs 170 then transfers to the remaining coils 77 of the springs 170. The resulting enlargement in diameter of the spring coil portion 74 of each spring 170 shifts each spring 170 from a locking mode to a release mode. With air then flowing into the sleeve lower portion inner openings 154 from the conduits 48 in the bottom cover plate 26, the pins 90 contained by the sleeves 142 may floats upward. As noted above, mode shifting of the springs 170 may be effected by rotating of only one spring end coil, end coil 78 or end coil 80.

While embodiments, uses and advantages of this invention have been shown and discussed, it should be understood that this invention is limited only by the scope of the claims. Those skilled in the art will appreciate that various modifications or changes may be made without departing from the scope and spirit of the invention, and these modifications and changes may result in still further uses and advantages.

What I claim is:

1. A method of operating a device comprising the steps of:
   a. extending a pin through a spring carried by said device,
   b. placing said spring in a release mode, so that said pin fits loosely in said spring and thereby allows pin movement, by applying a flexing force to at least one end coil of said spring to increase a diameter of said spring,
   c. moving said pin outward from said device so that a first end of said pin may interact with an object, and
   d. placing said spring in locking mode, so that said pin is held tightly by said spring and thereby restrains pin movement, by relaxing said flexing force on said end coil,
   wherein any said pin-object interaction selectively inhibits object movement.

2. A method as defined by claim 1 and further characterized by step c. including,
   applying air to a second end of said pin to effect said movement, and
   guiding said pin movement to promote pin-spring alignment.

3. A method of operating a device particularly adapted to support an object located above said device, said method comprising the steps of:
   a. locating a spring in a release mode in a vertical bore of a support block of said device and applying a force to at least one end coil of said spring to increase a diameter of said spring to place said spring in said release mode,
   b. extending a pin through said spring,
   c. moving said pin upward until said pin engages said object,
   d. securing said engaging location of said pin by placing said spring in a locking mode, and
   step a. further including operatively connecting an arm attached to said spring end coil to a slide bar carried by said support block, and
   e. moving said slide bar,
   wherein, with said pin locked in place, said pin supports said object.

4. A method of operating a device particularly adapted to support an object located above said device, said method comprising the steps of:
   a. locating a spring in a release mode in a vertical bore of a support block of said device,
   b. extending a pin through said spring,
   c. moving said pin upward until said pin engages said object,
   d. securing said engaging location of said pin by placing said spring in a locking mode by applying a force to at least one end coil of said spring to decrease a diameter of said spring to place said spring in a locking mode, and step d. further including operatively connecting an arm attached to said spring end coil to a slide bar carried by said support block, and e. moving said slide bar, wherein, with said pin locked in place, said pin supports said object.

5. A method for supporting an object, said method comprising the steps of:

a. locating a spring in a bore of a support block,
   b. loosely extending a pin through said spring,
   c. moving said pin upward to engage said object with an outer end of said pin by applying a force to an inner end of said pin,
   d. maintaining said pin-object engagement by placing said spring in a locking mode by applying a rotational force to at least one end coil of said spring to decrease a diameter of said spring, and step a. including said support block having a set of spaced apart bores with said bores carrying respective springs and pins, and step d. including operatively connecting arms attached respectively to said spring end coils to a slide bar carried by said block, and e. moving said slide bar.

6. A method of operating a device comprising the steps of:

a. placing a pin inside a spring carried by said device so that a first end of said pin extends outward from said spring for engagement with an object,
   b. placing said spring in a locking mode, so that said pin is held tightly in place by said spring, by applying a flexing force to at least one end coil of said spring to reduce a diameter of said spring,
   c. placing said spring in a release mode, so that said pin is held loosely by said spring, by relaxing said flexing force on said spring end coil, and
   d. moving said pin toward said spring to separate said pin from said object, wherein any said pin-object engagement with said spring in said locking mode selectively inhibits object movement.

\* \* \* \* \*